(12) United States Patent
Song et al.

(10) Patent No.: US 11,498,224 B1
(45) Date of Patent: Nov. 15, 2022

(54) FULLY AUTOMATIC INTELLIGENT SPRAYING ROBOT

(71) Applicant: Xi'an University of Architecture and Technology, Xi'an (CN)

(72) Inventors: Lijun Song, Xi'an (CN); Huan Guo, Xi'an (CN); Zhe Li, Xi'an (CN); Jiajie Hou, Xi'an (CN); Yijie Liu, Xi'an (CN); Yun Yan, Xi'an (CN); Yunlong Li, Xi'an (CN); Hang Liu, Xi'an (CN); Fengxiu Liu, Xi'an (CN); Ting Gan, Xi'an (CN)

(73) Assignee: Xi'an University of Architecture and Technology, Xi'an (CN)

( * ) Notice: Subject to any disclaimer, the term of this patent is extended or adjusted under 35 U.S.C. 154(b) by 0 days.

(21) Appl. No.: 17/724,275

(22) Filed: Apr. 19, 2022

(30) Foreign Application Priority Data

Apr. 29, 2021 (CN) .......................... 202110473958.2

(51) Int. Cl.
| | | |
|---|---|---|
| *B60P 1/04* | (2006.01) | |
| *B25J 11/00* | (2006.01) | |
| *B05B 13/04* | (2006.01) | |
| *B25J 5/00* | (2006.01) | |
| *B25J 19/02* | (2006.01) | |

(52) U.S. Cl.
CPC ....... *B25J 11/0075* (2013.01); *B05B 13/0431* (2013.01); *B25J 5/007* (2013.01); *B25J 19/026* (2013.01)

(58) Field of Classification Search
CPC ......... B05B 13/0431; B25J 5/007; B05D 1/02
See application file for complete search history.

(56) References Cited

U.S. PATENT DOCUMENTS

2018/0326886 A1* 11/2018 Sibley ................. G05D 1/0225
2019/0248007 A1*  8/2019 Duffy .................. B25J 15/0066

FOREIGN PATENT DOCUMENTS

| CN | 106391373 A | 2/2017 |
|---|---|---|
| CN | 206613785 U | 11/2017 |
| CN | 107413564 A | 12/2017 |
| CN | 108252498 * | 2/2018 |

(Continued)

OTHER PUBLICATIONS

First Office Action issued in counterpart Chinese Patent Application No. 202110473958.2, dated Sep. 26, 2021.

(Continued)

*Primary Examiner* — Nathan T Leong
(74) *Attorney, Agent, or Firm* — Westbridge IP LLC

(57) ABSTRACT

Disclosed is a fully automatic intelligent spraying robot. The robot includes a chassis, a driving device, a sliding device, a clamping device, a detection device and a control device; the driving device is fixedly connected to the chassis, and the driving device drives the chassis to move freely on the ground; the sliding device is fixed on the chassis; one end of the clamping device is used to fix a spray gun, and the other end of the clamping device is connected to the sliding device, and the clamping device can freely slide along the height direction of the sliding device; the detection device is fixed on the chassis, and the control device is also fixed on the chassis; and the control device is respectively in signal connection with the driving device, the sliding device, the clamping device and the detection device.

8 Claims, 4 Drawing Sheets

(56) References Cited

FOREIGN PATENT DOCUMENTS

| | | | |
|---|---|---|---|
| CN | 108252498 | A | 7/2018 |
| CN | 108405222 | * | 8/2018 |
| CN | 108405222 | A | 8/2018 |
| CN | 207714704 | U | 8/2018 |
| CN | 109235844 | A | 1/2019 |
| CN | 109466717 | A | 3/2019 |
| CN | 209303021 | U | 8/2019 |
| CN | 110761539 | A | 2/2020 |
| CN | 110841844 | A | 2/2020 |
| CN | 111054553 | A | 4/2020 |
| CN | 111256645 | A | 6/2020 |
| CN | 111451055 | A | 7/2020 |
| CN | 111452064 | A | 7/2020 |
| CN | 111576180 | A | 8/2020 |
| GB | 201706972 | | 6/2017 |
| JP | 2021048813 | A | 4/2021 |
| KR | 101856406 | B1 | 6/2018 |
| WO | 2016207627 | A2 | 12/2016 |

OTHER PUBLICATIONS

Second Office Action issued in counterpart Chinese Patent Application No. 202110473958.2, dated Nov. 10, 2021.

\* cited by examiner

FULLY AUTOMATIC INTELLIGENT SPRAYING ROBOT

CROSS-REFERENCE TO RELATED APPLICATIONS

This application claims priority to Chinese Patent Application No. 202110473958.2, filed on Apr. 29, 2021, the contents of which are hereby incorporated by reference.

TECHNICAL FIELD

The application relates to the technical field of building construction, and in particular to a fully automatic intelligent spraying robot.

BACKGROUND

With the informatization, industrialization and intelligent technology involving all aspects of manufacturing industry, the automation of paint spraying on large-area surfaces has become an urgent problem to be solved.

At present, the conventional spraying technology uses manual spraying or spraying machine for spraying. When manual spraying is used for large-area surfaces, the work is pretty labor intensive. Moreover, long working hours lead to low working efficiency of workers and affect the delivery period. However, when the existing spraying machine is used to spray the surface of a large area, although the number of workers is reduced, the spraying efficiency is still very low, and the spraying quality is poor, resulting in uneven coating thickness in each area.

Therefore, how to solve the problems of a large number of participants, low spraying efficiency and poor spraying quality during large-area spraying operations in the prior art has become an important technical problem to be solved by technicians in this field.

SUMMARY

The objective of the application is to provide a fully automatic intelligent spraying robot to solve the technical problems of a large number of participants, low spraying efficiency and poor spraying quality during large-area spraying operations in the prior art. The technical effects brought by the preferred technical scheme among many technical schemes provided by the application are detailed in the following description.

To achieve the above objective, the application provides the following technical scheme.

The application provides a fully automatic intelligent spraying robot, which includes:

a chassis;

a driving device, which is fixedly connected to the chassis and drives the chassis to move freely on the ground;

a sliding device which is fixed on the chassis;

a clamping device, one end of which is used to fix the spray gun, the other end of which is connected to the sliding device, and the clamping device can freely slide along the height direction of the sliding device;

a detection device which is fixed on the chassis; and a control device, which is fixed on the chassis and is in signal connection with the driving device, the sliding device, the clamping device and the detection device respectively.

On the basis of the above technical scheme, the application could also make the following improvements.

In an embodiment, the driving device includes two pairs of rollers rotatably and fixedly connected to the chassis, an independent controller fixed to the chassis, and a driver and a disc brake mechanism which are fixed to the roller; and the independent controller is respectively in signal connection with the control device, the driver and the disc brake mechanism.

In an embodiment, the sliding device includes a timing belt, a drive plate fixed on the timing belt, a fixing frame vertically fixedly connected to the chassis, a motor fixed on the chassis and a timing belt pulley rotatably connected to the top of the fixing frame; a guide rail for sliding the timing belt is arranged along the height direction of the fixing frame; the motor is electrically connected with the control device; one end of the timing belt is slidably connected with an output shaft of the motor, and the other end of the timing belt is engaged with the timing belt pulley.

In an embodiment, the clamping device includes a reverse damper, a trapezoidal connecting frame fixedly connected to the drive plate, an angle control motor fixedly connected with the trapezoidal connecting frame and a connecting clip rotatably connected with the angle control motor; the angle control motor is electrically connected with the control device, one end of the reverse damper is fixedly connected with the connecting clip, and the other end of the reverse damper is fixedly connected with the trapezoidal connecting frame.

In an embodiment, the detection device includes a plurality of ultrasonic radars; each ultrasonic radar is fixedly connected to the chassis and is distributed along the circumferential direction of the chassis; and each ultrasonic radar is in signal connection with the control device.

In an embodiment, the control device includes a main controller, a power supply device and a servo motor; the main controller is in signal connection with the servo motor, and the power supply device is electrically connected with the main controller, the ultrasonic radars, the angle control motor and the servo motor.

In an embodiment, the power supply device includes a first power module, a second power module and a battery pack.

In an embodiment, the number of ultrasonic radars is ten, of which four ultrasonic radars are fixed at the front end of the chassis, four ultrasonic radars are fixed at the rear end of the chassis, and two ultrasonic radars are respectively fixed at both sides of the chassis.

In an embodiment, a closed-loop feedback mechanism is arranged inside the driver, and the closed-loop feedback mechanism is in signal connection with the independent controller.

In an embodiment, the connecting clip is provided with an adjustable clamping opening, and the inner wall of the clamping opening is fixedly attached with anti-skid stripes.

The technical scheme provided by the application has the following beneficial effects.

In the technical scheme provided by the application, the fully automatic intelligent spraying robot includes a chassis, a driving device, a sliding device, a clamping device, a detection device and a control device; the driving device is fixedly connected to the chassis, and the driving device drives the chassis to move freely on the ground; the sliding device is fixed on the chassis; one end of the clamping device is used to fix the spray gun, and the other end of the clamping device is connected to the sliding device; and the clamping device could freely slide along the height direction of the sliding device, the detection device is fixed on the chassis, and the control device is also fixed on the chassis, and the control device is in signal connection with the driving device, the sliding device, the clamping device and the detection device respectively. In this way, the driving device could provide power for the movement of the automatic intelligent spraying robot, and the chassis is used for bearing the detection device, the control device, the sliding device and the clamping device. The detection device is used for dynamically identifying the surrounding external environment and providing external information for the control device to plan the spraying path; the clamping device could firmly fix the spray gun on it; the sliding device is used for controlling the accurate movement of the spray gun in the height direction; and the clamping device could control the pitch angle of the spray gun and reduce the end vibration of the spray gun. Therefore, the robot solves the problems of a large number of participants, low spraying efficiency and poor spraying quality during large-area spraying operations in the prior art.

BRIEF DESCRIPTION OF THE FIGURES

In order to more clearly explain the embodiments of the application or the technical solutions in the prior art, the following will briefly introduce the drawings that need to be used in the description of the embodiments or the prior art. Obviously, the drawings in the following description are only some embodiments of the application, and for ordinary technicians in the field, other drawings could be obtained according to these drawings without creative efforts.

DETAILED DESCRIPTION OF THE EMBODIMENTS

In order to make the objective, technical scheme and advantages of the application clearer, the technical scheme of the application will be described in detail below. Obviously, the described embodiments are only part of the embodiments of the application, not all of them. Based on the embodiments in the application, all other embodiments obtained by ordinary technicians in the field without making creative efforts are within the scope of the application.

The objective of this embodiment is to provide a fully automatic intelligent spraying robot, thereby solving the problems of a large number of participants, low spraying efficiency and poor spraying quality during large-area spraying operations in the prior art.

Embodiments will be described with reference to the drawings below. In addition, the embodiments shown below do not limit the application described in the claims. In addition, the entire content of the structure represented in the following examples is not limited to what is necessary as the solution of the application described in the claims.

Figure 1:
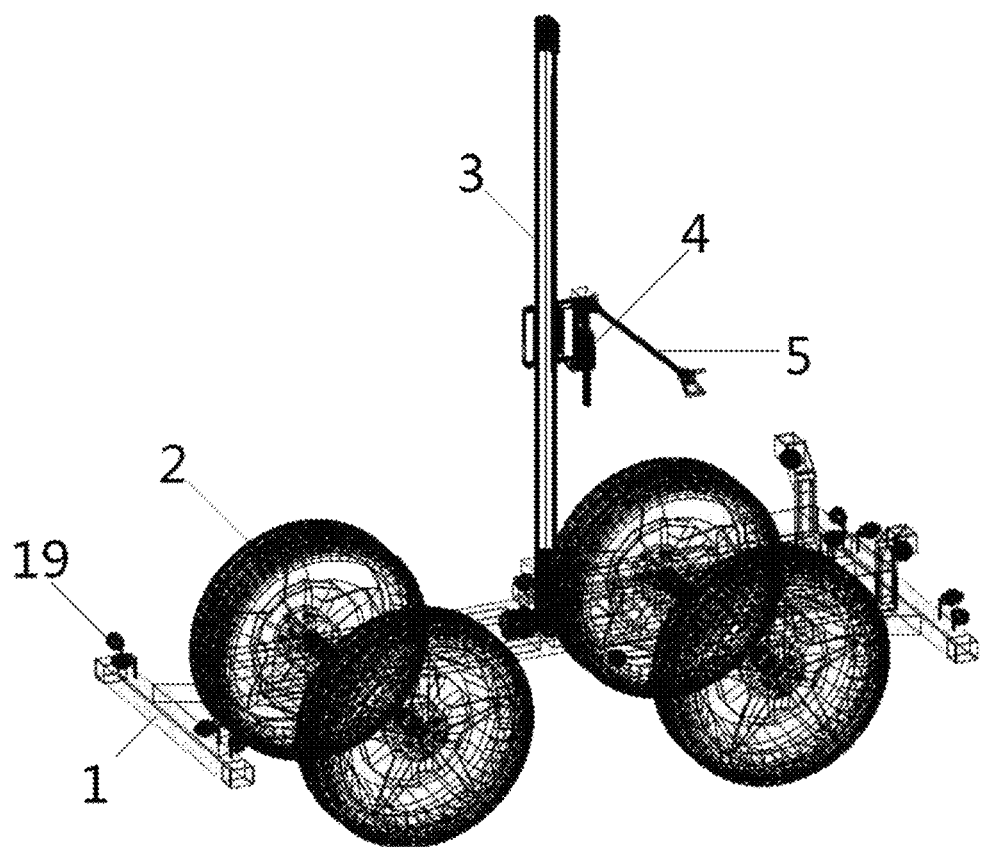
FIG. 1 is a schematic diagram of the whole structure of a fully automatic intelligent spraying robot in an embodiment of the application.
Figure 2:
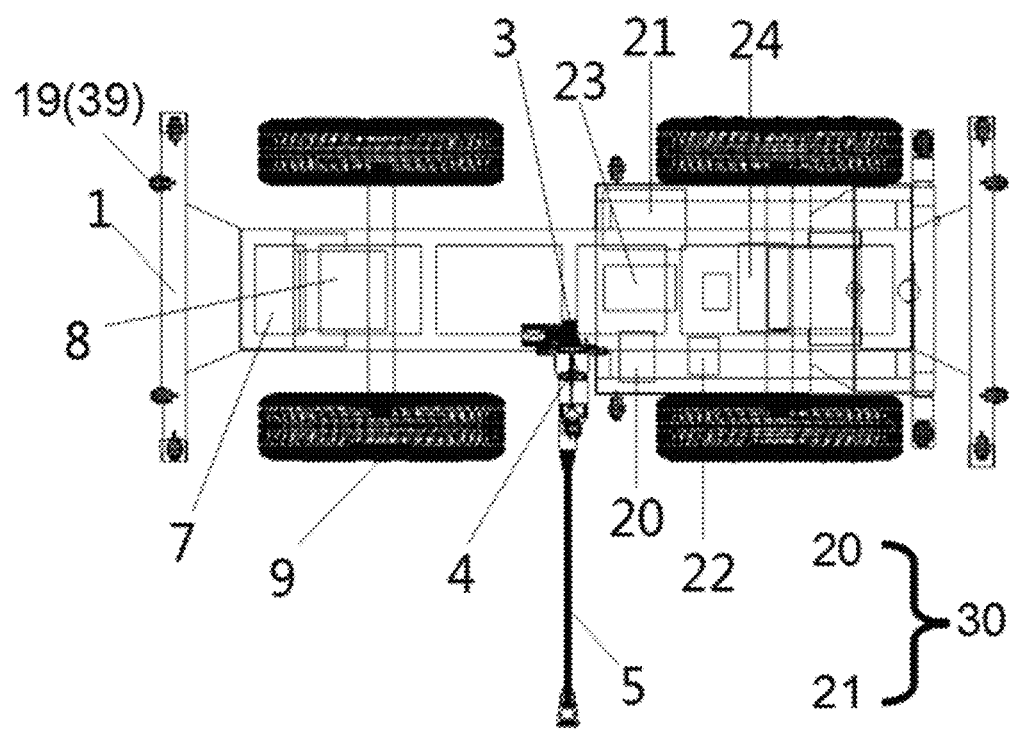
FIG. 2 is a top view of the fully automatic intelligent spraying robot in the embodiment of the application.
Figure 3:
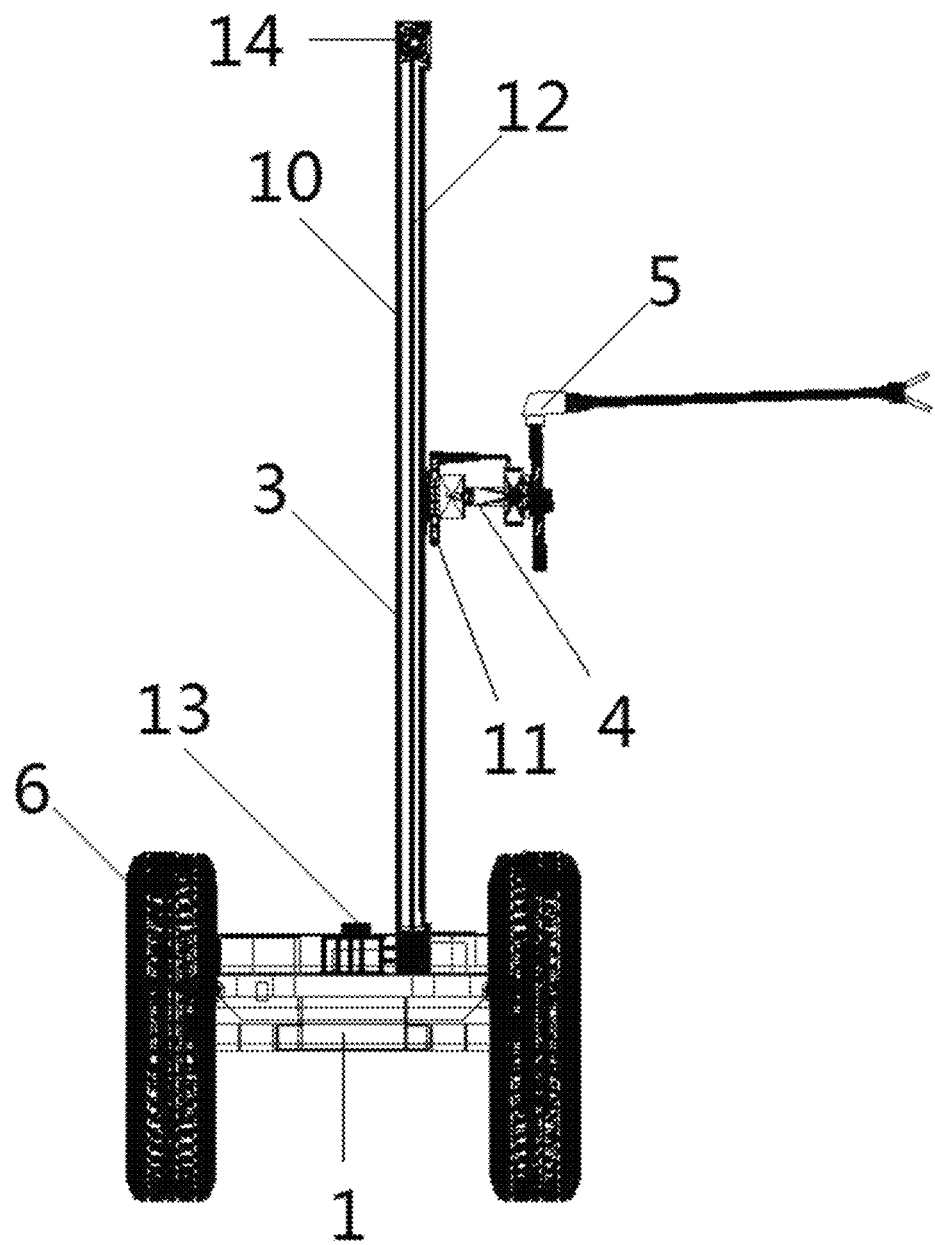
FIG. 3 is a left view of the fully automatic intelligent spraying robot in the embodiment of the application.
Figure 4:
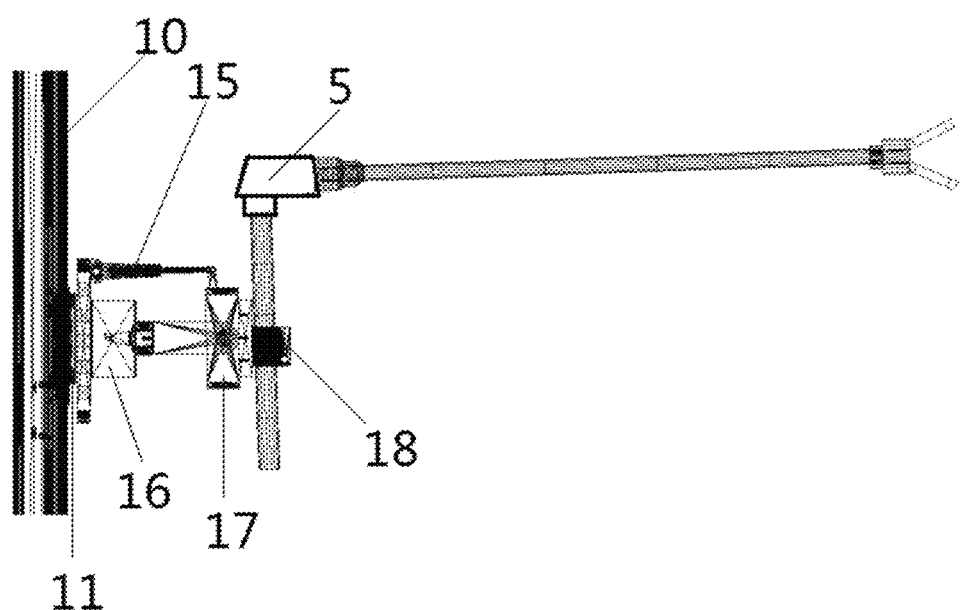
FIG. 4 is a structural diagram of a clamping device in the embodiment of the application.

With reference to FIGS. 1-4, this embodiment provides a fully automatic intelligent spraying robot, which includes a chassis 1, a driving device 2, a sliding device 3, a clamping device 4, a detection device 39, a control device 30. In this embodiment, the chassis 1 is preferably a chassis 1 with Ackermann corner structure; the driving device 2 is fixedly connected to the chassis 1, and the driving device 2 drives the chassis 1 to move freely on the ground, and the sliding device 3 is fixed on the chassis 1; one end of the clamping device 4 is used to fix a spray gun 5, the other end of the clamping device 4 is connected to the sliding device 3, and the clamping device 4 could freely slide along the height direction of the sliding device 3; the detection device 39 is fixed on the chassis 1, the control device 30 is also fixed on the chassis 1, and the control device 30 is respectively in signal connection with the driving device 2, the sliding device 3, the clamping device 4 and the detection device 39 through signal lines.

In this way, the driving device 2 could provide power for the movement of the automatic intelligent spraying robot, and the chassis 1 is used for bearing the detection device 39, the control device 30, the sliding device 3 and the clamping device 4. The detection device 39 is used for dynamically identifying the surrounding external environment and detecting the spatial position of the automatic intelligent spraying robot; the detection device 39 provides external information for the control device 30 to plan the spraying path, and transmits the collected information signals of the surrounding environment to the control device 30; then, the control device 30 processes and analyzes the collected information, and controls the spraying and walking of the automatic intelligent spraying robot; the clamping device 4 can firmly fix the spray gun 5 on it, and the sliding device 3 can provide the accurate movement stroke of the spray gun 5 in the height direction, and can control the movement track and the staying height of the spray gun 5; the clamping device 4 can control the pitch angle of the spray gun 5, and meanwhile can balance the weight of spray gun 5 and reduce the vibration at the end of spray gun 5; when the automatic intelligent spraying robot enters a spraying site, with the detection device 39 and the control device 30, the automatic intelligent spraying robot can automatically plan a suitable spraying route and adjust the distance between the automatic intelligent spraying robot and the surface to be sprayed. After the clamping device 4 adjusts the pitch angle of the spray gun 5, the spraying pump is started. Under the joint drive of the sliding device 3 and the clamping device 4, the spray gun 5 finishes spraying the surface to be sprayed in a serpentine path. When encountering a corner of 90°, the automatic intelligent spraying robot first stops running, turns off the spray gun 5, runs backward for a certain distance to complete the posture adjustment with the minimum turning radius, and then goes back to the last stop point to continue to finish the spraying operation until the predetermined spraying distance is completed, and the automatic intelligent spraying robot automatically stops when it returns to the stop point; the automatic intelligent spraying robot realizes intelligent spraying for large-area spraying surface; the automatic intelligent spraying robot takes intelligent spraying as its concept, realizes all-intelligent operation of spraying work, effectively improves spraying efficiency and spraying quality, and reduces manual intervention degree of spraying work and labor cost, thereby solving the problems of a large number of participants, low spraying efficiency and poor spraying quality during large-area spraying operations in the prior art.

As an alternative embodiment, the driving device 2 includes two pairs of rollers 6, an independent controller 7, a driver 8 and a disc brake mechanism 9. In this embodiment, the rollers 6 are preferably 17-inch rubber shock-absorbing tires, which can overcome 30-degree slopes and obstacles with a height of less than 20 cm; the two pairs of rollers 6 are rotatably and fixedly connected to the chassis 1 through drive shafts, the independent controller 7 is fixedly connected to the chassis 1 through bolts, and the driver 8 and the disc brake mechanism 9 are arranged in the roller 6; and the independent controller 7 is respectively in signal connection with the control device 30, the driver 8 and the disc brake mechanism 9. In this embodiment, a closed-loop feedback mechanism is arranged inside the driver 8, and the closed-loop feedback mechanism is in signal connection with the independent controller 7. In this way, the independent controller 7 is used to control the constant speed and distance running of the vehicle; the closed-loop feedback mechanism in the driver 8 is used to accurately control the accurate motion track of the driving device 2; and the disc brake mechanism 9 is used to control the automatic intelligent spraying robot to stably stay at the target position in the stopped state.

As an alternative embodiment, the sliding device 3 includes a timing belt 10, a drive plate 11, a fixing frame 12, a motor 13 and a timing belt pulley 14. In this embodiment, the fixing frame 12 is preferably an L-shaped fixing frame 12, and a guide rail for sliding the timing belt 10 is arranged along the height direction of the fixing frame 12; the fixing frame 12 is vertically fixedly connected to the chassis 1 through bolts, the drive plate 11 is fixedly connected to the timing belt 10 through bolts, and the base of the motor 13 is fixed to the chassis 1 through bolts; the timing belt pulley 14 is rotatably connected to the top of the fixing frame 12, the motor 13 is electrically connected with the control device 30 through wires, one end of the timing belt 10 is slidably connected with an output shaft of the motor 13, and the other end of the timing belt 10 is engaged with the timing belt pulley 14. In this way, the motor 13 receives a driving signal transmitted by the control device 30, and the output shaft of the motor 13 rotates at a specific angle to drive the timing belt 10 and the timing belt pulley 14 engaged with the timing belt 10 to move together, so that the fixed point on the timing belt 10 can move for a specified distance at a specified speed, and the timing belt 10 drives the drive plate 11 to slide on the guide rail surface, thereby driving the clamping device 4 on the drive plate 11 to move.

In a more specific embodiment, the clamping device 4 includes a reverse damper 15, a trapezoidal connecting frame 16, an angle control motor 17 and a connecting clip 18. In this embodiment, the connecting clip 18 is preferably a U-shaped connecting clip 18, and the connecting clip 18 is provided with an adjustable clamping opening, and anti-skid stripes are fixedly attached to the inner wall of the clamping opening; the trapezoidal connecting frame 16 is fixedly connected to the end face of the drive plate 11 through bolts, the base of the angle control motor 17 is fixedly connected with the trapezoidal connecting frame 16 through bolts, the connecting clip 18 is fixed on a drive shaft of the angle control motor 17, and the angle control motor 17 is electrically connected with the control device 30 through wires; one end of the reverse damper 15 is fixedly connected with the connecting clip 18, and the other end of the reverse damper 15 is fixedly connected with the trapezoidal connecting frame 16. In this way, according to the instruction given by the control device 30, the angle control motor 17 rotates a specific angle for controlling the pitch angle between the spray gun 5 and the surface to be sprayed; the connecting clip 18 has an adjustable clamping caliber, and the inner wall of the connecting clip 18 is fixedly bonded with anti-skid stripes, which can be used for stable clamping of different spray guns 5. The reverse damper 15 is used to balance the static load of the spray gun 5 and reduce the movement of the spray gun 5 and the end vibration during the spraying process.

In a more specific embodiment, the detection device 39 includes a plurality of ultrasonic radars 19; each ultrasonic radar 19 is fixedly connected to the chassis 1 respectively and is distributed along the circumferential direction of the chassis 1 respectively, each ultrasonic radar 19 is in signal connection with the control device 30; and the number of ultrasonic radars 19 can be set according to the specific use environment. In this embodiment, the number of ultrasonic radars 19 is preferably ten, in which four ultrasonic radars 19 are fixed at the front end of chassis 1 side by side at intervals, four ultrasonic radars 19 are fixed at the rear end of chassis 1 side by side at intervals, and two ultrasonic radars 19 are symmetrically fixed at both sides of chassis 1 respectively. In this way, the ultrasonic radar 19 in this embodiment is preferably a high-precision ultrasonic sensor with the model of HC-03. The ultrasonic radars 19 in different positions have different functions; one part of the ultrasonic radars 19 is used to detect obstacles in front, control the automatic intelligent spraying robot to steer reasonably and avoid real-time obstacles in front and back; the other part of the ultrasonic radars 19 is used to judge the steering conditions, assist the robot to steer, obtain the current spraying distance and the included angle between the front end of the spray gun 5 and the surface to be sprayed, and feed back to the control system to adjust the posture of the automatic intelligent spraying robot.

In a more specific embodiment, the control device 30 includes a main controller 20, a power supply device and a servo motor 21. In this embodiment, the model of the main controller 20 is preferably the ATMEL MEAG2560 single chip processor, and the main controller 20 is used to collect the detection signals of the detection device 39 and control the robot to advance, rotate and spray; the main controller 20 is in signal connection with the servo motor 21, and the power supply device is electrically connected with the main controller 20, the ultrasonic radar 19, the angle control motor 17 and the servo motor 21 through wires, and the power supply device provides electric energy for all electric equipment of the whole automatic intelligent spraying robot; the power supply device includes a first power module 22, a second power module 23 and a battery pack 24. In this embodiment, the first power module 22 provides a voltage of 5 V and the second power module 23 provides a voltage of 24 V. In this way, the first power module 22 is used to provide electric energy to the detection device 39, the main controller 20 and the angle control motor 17, the second power module 23 is used to provide electric energy required by the operation of the servo motor 21, and the battery pack 24 is used to provide sufficient electric energy to the whole control system.

In the description of the application, it should be understood that the azimuth or positional relationship indicated by the terms "longitudinal", "transverse", "upper", "lower", "front", "rear", "left", "right", "vertical", "horizontal", "top", "bottom", "inner", "outer" and so on is based on the azimuth or positional relationship shown in the attached drawings for the convenience of describing the application, rather than indicating or implying that the device or element must have a specific orientation, be constructed and operated in a specific orientation, it cannot be understood as a limitation of the application.

The above is only the concrete embodiment of the application, but the scope of protection of the application is not limited to this. Anyone familiar with the technical field can easily think of changes or substitutions within the technical scope disclosed by the application, which should be covered by the scope of protection of the application. Therefore, the scope of protection of the application should be based on the scope of protection of the claims.

What is claimed is:

1. A fully automatic intelligent spraying robot, comprising:
a chassis;
a driving device fixedly connected to the chassis, the driving device driving the chassis to move freely on ground;
a sliding device fixed on the chassis;
a clamping device, one end of the clamping device being used to fix a spray gun, the other end of the clamping device being connected to the sliding device, and the clamping device being able to freely slide along a height direction of the sliding device;
a detection device fixed on the chassis; and
a control device fixed on the chassis, the control device being in signal connection with the driving device, the sliding device, the clamping device and the detection device respectively;
wherein the sliding device comprises a timing belt, a drive plate fixed on the timing belt, a fixing frame vertically fixedly connected to the chassis, a motor fixed on the chassis and a timing belt pulley rotatably connected to the top of the fixing frame; a guide rail for sliding the timing belt is arranged along the height direction of the fixing frame; the motor is electrically connected with the control device; one end of the timing belt is slidably connected with an output shaft of the motor, and the other end of the timing belt is engaged with the timing belt pulley;
the clamping device comprises a reverse damper, a trapezoidal connecting frame fixedly connected to the drive plate, an angle control motor fixedly connected to the trapezoidal connecting frame, and a connecting clip rotatably connected with the angle control motor; the angle control motor is electrically connected with the control device, one end of the reverse damper is fixedly connected with the connecting clip, and the other end of the reverse damper is fixedly connected with the trapezoidal connecting frame.

2. The fully automatic intelligent spraying robot according to claim 1, wherein the driving device comprises two pairs of rollers rotatably and fixedly connected to the chassis, an independent controller fixed to the chassis, and a driver and a disc brake mechanism which are fixed to the roller; and the independent controller is respectively in signal connection with the control device, the driver and the disc brake mechanism.

3. The fully automatic intelligent spraying robot according to claim 2, wherein a closed-loop feedback mechanism is arranged inside the driver, and the closed-loop feedback mechanism is in signal connection with the independent controller.

4. The fully automatic intelligent spraying robot according to claim 1, wherein the detection device comprises a plurality of ultrasonic radars; each ultrasonic radar is fixedly connected to the chassis and is distributed along the circumferential direction of the chassis; and each ultrasonic radar is in signal connection with the control device.

5. The fully automatic intelligent spraying robot according to claim 4, wherein the control device comprises a main controller, a power supply device and a servo motor; the main controller is in signal connection with the servo motor, and the power supply device is electrically connected with the main controller, the ultrasonic radars, the angle control motor and the servo motor.

6. The fully automatic intelligent spraying robot according to claim 5, wherein the power supply device comprises a first power module, a second power module and a battery pack.

7. The fully automatic intelligent spraying robot according to claim 4, wherein the number of ultrasonic radars is ten, of which four ultrasonic radars are fixed at the front end of the chassis, four ultrasonic radars are fixed at the rear end of the chassis, and two ultrasonic radars are respectively fixed at both sides of the chassis.

8. The fully automatic intelligent spraying robot according to claim 1, wherein the connecting clip is provided with an adjustable clamping opening, and the inner wall of the clamping opening is fixedly attached with anti-skid stripes.

* * * * *